(12) United States Patent
Mendel et al.

(10) Patent No.: US 9,059,994 B2
(45) Date of Patent: *Jun. 16, 2015

(54) SYSTEM UTILIZING A SECURE ELEMENT (71) Applicant: Broadcom Corporation, Irvine, CA (US)

(72) Inventors: Jacob Mendel, Kibbutz Givat Brenner (IL); Alexander Potievsky, Kfar Saba (IL); Eyal Webber-Zvik, Kfar Yona (IL)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/971,578

(22) Filed: Aug. 20, 2013

(65) Prior Publication Data

US 2013/0340090 A1 Dec. 19, 2013

Related U.S. Application Data

(63) Continuation of application No. 13/312,241, filed on Dec. 6, 2011, now Pat. No. 8,549,586.

(51) Int. Cl.
*G06F 21/00* (2013.01)
*H04L 29/06* (2006.01)

(52) U.S. Cl.
CPC ............... *H04L 63/10* (2013.01); *G06F 21/00* (2013.01)

(58) Field of Classification Search
CPC .................. G11B 20/00086; G11B 20/0021; G06Q 20/382; H04L 63/10; H04L 29/06; G06F 21/00
USPC ........................................................ 726/4
See application file for complete search history.

(56) References Cited

U.S. PATENT DOCUMENTS

| | | | |
|---|---|---|---|
| 8,379,863 B1 * | 2/2013 | Pelly et al. | 380/277 |
| 8,385,553 B1 * | 2/2013 | Jooste et al. | 380/277 |
| 2005/0278563 A1 * | 12/2005 | Durham et al. | 714/4 |
| 2006/0031247 A1 * | 2/2006 | Shah | 707/102 |
| 2007/0282754 A1 * | 12/2007 | Owen et al. | 705/64 |
| 2010/0083384 A1 * | 4/2010 | Borchert et al. | 726/27 |
| 2010/0095130 A1 * | 4/2010 | Bertran et al. | 713/189 |
| 2012/0084211 A1 * | 4/2012 | Petrov et al. | 705/64 |
| 2012/0149338 A1 * | 6/2012 | Roundtree | 455/411 |

* cited by examiner

*Primary Examiner* — Matthew Smithers
(74) *Attorney, Agent, or Firm* — Brinks Gilson & Lione (57) ABSTRACT

A device includes a receiver configured to receive a request to perform a function. A secure element connected with the receiver, the secure element to verify the request to perform the function, where the secure element is configured to operate in either a report mode or a silent mode. Details about a status of the performance of the function are displayed when the device operates in the report mode, and no details about the status of the performance of the function are displayed when the device operates in the silent mode.

20 Claims, 6 Drawing Sheets

SYSTEM UTILIZING A SECURE ELEMENT

PRIORITY CLAIM

This application is a continuation of U.S. application Ser. No. 13/312,241, filed Dec. 6, 2011, which is incorporated herein by reference in its entirety.

TECHNICAL FIELD

This disclosure relates to systems and methods (generally referred to as systems) utilizing a secure element. More specifically, this disclosure relates to systems utilizing a secure element for performing secure operations.

BACKGROUND

Significant advances in technology have driven strong growth in the availability and capability of electronic devices, as well as a steady and continual evolution in network infrastructure useful for the communication of these electronic devices. As just a few examples, it is not unusual for a consumer to own one or more cell phones, laptops, tablet computers, Global Positioning System ("GPS") devices, gaming systems, and televisions, one or more of which may be capable of communicating with each other through a network, such as the Internet. Consumer electronics are only one segment of the total market for communicating electronic devices, and today such electronic devices are found virtually everywhere in society.

The advent of electronic devices and the continued expansion of networking between such devices have provided businesses and individual users with an expansive medium through which to promote commerce. Businesses and consumers may leverage these developments to enter contracts, conduct transactions, and arrange for the exchange goods or services electronically.

BRIEF DESCRIPTION OF THE DRAWINGS

The system may be better understood with reference to the following drawings and description. In the figures, like reference numerals designate corresponding parts throughout the different views.

DETAILED DESCRIPTION

Consumers, manufacturers, businesses, financial institutions, corporations, and/or various other users ("users") may routinely perform confidential or private applications, operations, and transactions electronically. With an increase in electronic operations and transactions being performed, users can be exposed to hackers and risks of intrusions, theft, fraud, or compromised accounts or personal information. For example, when important, private, or confidential operations or transactions are performed, some thieves or hackers will attempt to steal personal, financial, or security information about a consumer or business, or manipulate one or more operations being performed. The systems and processes described herein protect against the theft of confidential information, such as by incorporating a secure element into various devices to test the security of the device and ensure that only trusted operations are performed. Protection mechanisms utilized by secure elements in electronic devices may, for example, include or incorporate temporal awareness through communications with remote servers, include or incorporate one or more scripts to perform a sequence of commands internally when triggered, include or access a combination of access rules enforced through a combination of hardware and software modules or components, and various other security or protection mechanisms.

Figure 1:
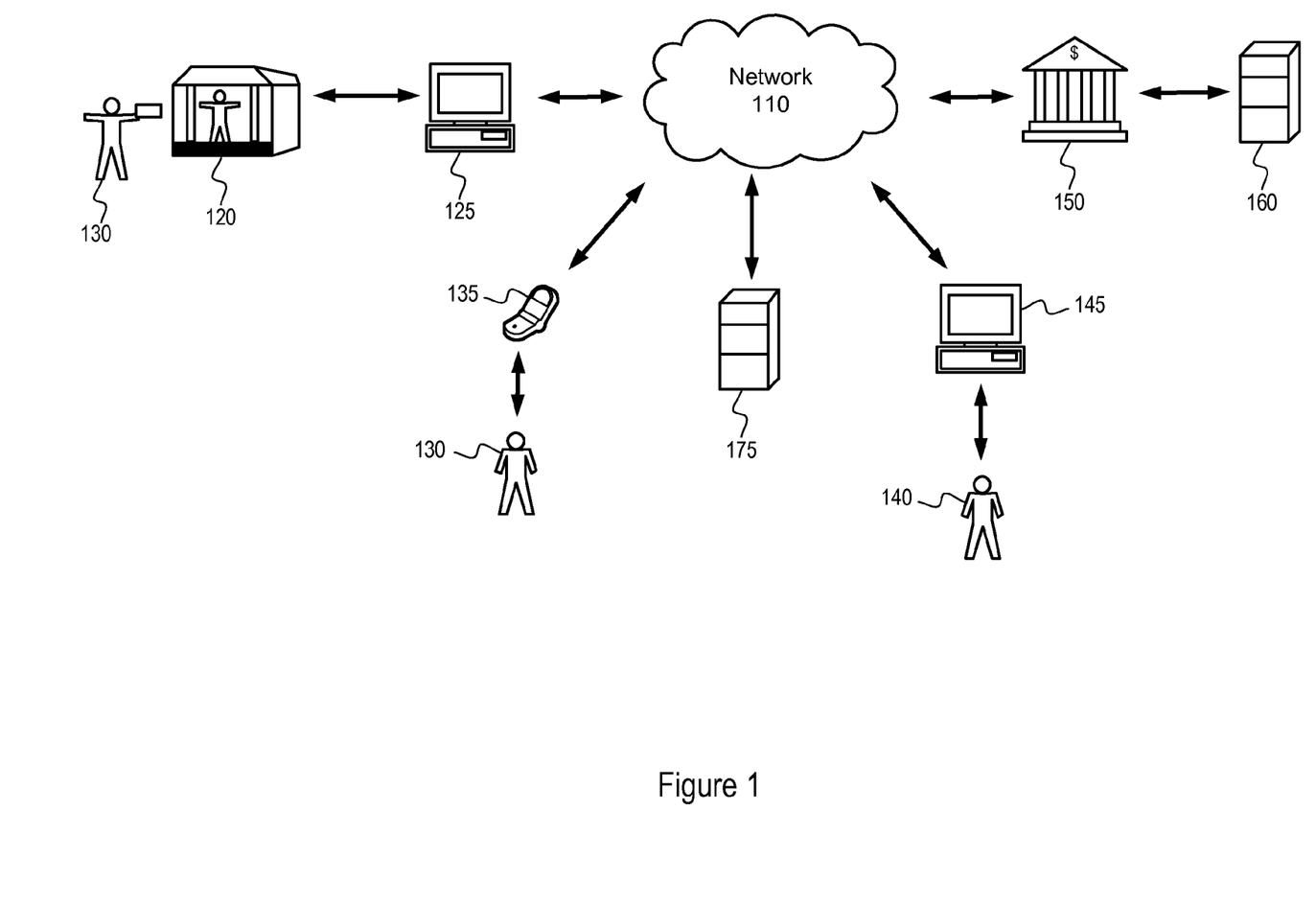
FIG. 1 is a block diagram of an exemplary network environment for performing transactions.

FIG. 1 is a block diagram of an example network environment in which users and businesses may interact and perform various operations, and transactions ("operations"). A network may include one or more users, such as a business 120, a consumer 130, and a financial institute 150. Users may utilize one or more electronic devices, such as a processor or computer 125, a mobile device 135, or a server 160. Other examples of electronic devices are possible, such as tablets, smart phones, personal digital assistants ("PDA"), or smart cards. One or more servers 175 may be accessible to one or more users through the network 110. Confidential, personal, authorization, and transactional information may be secured with any or all of the systems and processes described here.

One or more users, such as a business 120, a consumer 130, and a financial institution 150, may perform various operations or transactions while interacting with a network 110 with, through, or using one or more electronic devices. Many of these operations or transactions may be targets for fraud or theft.

As an example, a consumer 130, through or using an electronic device like a smart phone 135, computer, processor, personal digital assistant ("PDA"), tablet, or other devices such as a bank card or a credit card, may manage a bank account held at the financial institution 150. The consumer 130 may perform various types of transactions, such as depositing or withdrawing money from the bank account, transferring money from one or more accounts, requesting a cash advance, or generating a summary of the account balance, any of which may be targeted for fraud or theft.

As another example, a server for a credit card company may be configured or capable of performing various types of transactions for a consumer 130, such as a cash advance, credit card charge, or payment of a bill. The server can also be configured to perform one or more tasks or transactions for the credit card company, such as generating reports regarding users and credit lines, making payments to businesses requesting a transaction on behalf of a user, and various other tasks or transactions which many thieves may attempt to infiltrate or attack.

As another example of transactions that may be vulnerable to fraud or attack, a consumer 130, through or using an electronic device such as a mobile device 135, may electronically communicate and enter into a contract for goods or services with a business 120 over the network 110. A processor or server for a business 120 may provide a contract to the consumer 130, who may then be asked to electronically agree to and sign the contract, or perform one or more other transactions or tasks.

As still another example, a government institute may perform one or more cryptographic operations with, through, or using the network 110, such as processing, storing, encrypting, or decrypting important or top secret data and information, which a thief or hacker may attempt to infiltrate and steal. In other examples, one or more users may share, transmit, or receive over the network 110 one or more updates for user electronic devices, such as software updates, which may be scheduled for or run at various times. Still other examples of electronic transaction types that a hacker may attempt to infiltrate and manipulate may include, for example, electronically entering into contracts, purchasing or otherwise ordering various goods or services, authenticating one or more digital signatures or certificates, managing various accounts, viewing or managing various medical reports, paying bills, requesting and tracking various shipments or transfers, monitoring a status of personal or public information, taking part in various online auctions, and performing or conducting various other transactions.

During any of these or other operations or transactions, one or more thieves or hackers 140 may attempt to infiltrate the one or more devices 125, 135, and 160 or the network 110, such as with or using an electronic device 145 like a computer, processor, smart phone, PDA, or other electronic device. A hacker 140 may monitor a user, a user's accounts, transaction information, or one or more operations or transactions being performed over the network 110. The hacker 140 may attempt to identify, access, manipulate, change, destroy, or otherwise alter information used during the operation or transaction. For example, the hacker 140 may attempt to steal authorization information or transaction information like a digital signature or other authenticating certificate used during the transaction, may attempt to modify or change code in a software update being sent to one or more user devices to implement a virus on the device, may attempt to disable a security alarm that may otherwise be triggered during an operation, or may attempt to change an amount or account information related to a transaction being performed. Various other hacking efforts, risks or dangers may exist in conducting online or electronic operations or transactions. A user may not be aware or have any defense from these types of illicit activities performed without authorization by a hacker 140.

Figure 2:
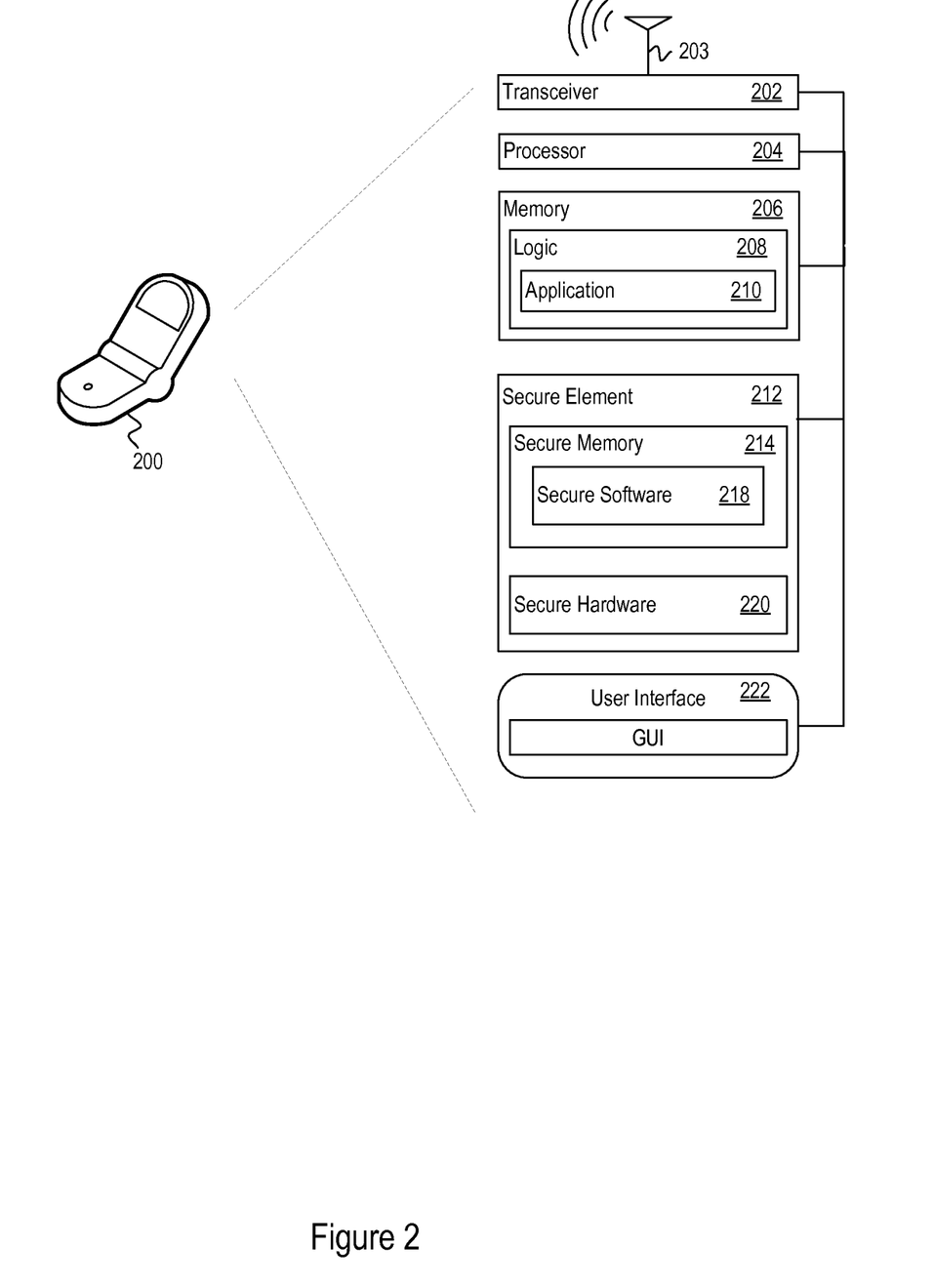
FIG. 2 is a block diagram of an exemplary device with a secure element.

To protect from thieves or hackers 140, an electronic device used by a user may be configured with or otherwise utilize a secure element designed to perform secure operations and transactions. FIG. 2 is a block diagram of a device 200 with a secure element 212 which may be used for securely performing and/or ratifying a legitimate operation or transaction. The secure element 212 may be configured to allow users, such as businesses 120, users 130, and financial institutions 150, to perform secure electronic operations and to perform secure transactions with each other without subjecting the operation or transaction to intrusion by a hacker 140. For explanatory purposes, the device 200 utilizing the secured element 212 may be a mobile device, as shown in this example. However, in other systems, the device 200 may take any form and may be any other electronic device.

The device 200 may include one or more of a transceiver 202, an antenna 203, a processor 204, a memory 206, a secure element 212, and a user interface 222. Fewer or more components may be included with the device 200.

The processor 204 may implement a software program, such as code or logic 208 generated manually or programmed to control an application 210. The memory 206 may operable to store instructions, code, or logic 208 executable by the processor 204 for implementing the application 210. While the application 210 is shown as logic 208, the application 210 may also or alternatively be software, code, or other instructions which may, for example, be stored in or apart from memory 206, hardware, a microcontroller, a central processing unit ("CPU"), an application-specific integrated circuit ("ASIC"), or various other hardware components, software components, firmware components, or combinations of components.

The application 210 may be used to perform, monitor, guide, control, and/or otherwise conduct part or all of an operation or transaction using the device 200. For example, the application 210 may control the operation or transaction, delegate system resources required for the operation or transaction, and/or provide an interface or display to the user for operation or transaction information, details, and prompts or requests for further user input. In some systems, the application 210 may generate, receive or transmit one or more commands or instructions for performing an operation or transaction.

The device may also or alternatively include a secure element 212. The secure element 212 may be a component, such as a secure integrated circuit, through with the device 200 may perform one or more secure functions, applications, operations, or transactions. In some systems, the secure element 212 may be configured to perform one or more secure functions, operations, or applications stored with the secure element 212. In other systems, the secure element 212 may be configured to perform one or more secure functions of an application which may be external to the secure element 212, such as application 210 or an application external to the device 200. The secure element 212 may verify requests received from an entity to perform the function. Various other functions and examples are possible.

The secure element 212 may be an embedded and/or additional and/or virtual secure element 212. The secure element 212 may be secured through the use of one or more protection mechanisms and functions, such as a temporal awareness through communications with remote servers such as server 175, one or more scripts to perform a sequence of commands internally when triggered, a combination of access rules enforced through a combination of hardware and software modules or components, and various other security mechanisms, as discussed later. In some systems, the secure element 212 may always be powered on and/or connected to the network 110 when the device 200 is operating. In other systems, the secure element 212 may be configured or operable to be powered off or disconnected from the network 110 when the device 200 is operating.

The secure element 212 may be configured or otherwise operable to securely store or access information and data, such as confidential, secret, or personal information or data that may be stored in a memory, such as secure memory 214 or secure hardware 220. The secure element 212 may include software or a software component, such as secure software 218, hardware or a hardware component, such as secure hardware 220, or both.

The secure memory 214 may operable to store instructions, code, or logic executable by the processor 204 for implementing software, such as secure software 218. The secure software 218 may also or alternatively be an application, code, or other instructions which may, for example, be stored in or apart from memory 214, hardware, a microcontroller, a central processing unit ("CPU"), an application-specific integrated circuit ("ASIC"), or various other hardware components, software components, firmware components, or combinations of components. The secure memory 214 may also or alternatively be used to store one or more of transaction information, authorization information, server verification information, or a digital signature or transaction key. In some systems, the secure software 218 may include instructions to determine an access right for an entity requesting performance of a function, and/or instructions to perform the function, such as when a secure hardware 220 verifies that the security of a secure element 212 has not been breached and an access right indicates that the entity is authorized to request performance of the secure function. In some systems, the secure memory 214 may be a memory in hardware, such as secure hardware 220, which may protect the secure memory 214 and prevent attacks or unauthorized use of any information or data stored in the secure memory 214 in various ways, such as through or using various encryption techniques. Other variations are possible.

The hardware or hardware component of the secure element 212, such as secure hardware 220, may be configured to perform one or more actions or functions of an application or software, such as the secure software 218. The secure hardware 220 may include or have access to one or more security devices or verification sensors, such as light sensors, laser sensors, temperature sensors, moisture sensors, and various other sensors. The hardware 220 may be programmed with instructions to verify that a security of the secure element 212 has not been breached. The secure hardware 220 may also or alternatively perform various other security operations or functions, such as, for example, performing an integrity check of the data stored in the secure memory 214, comparing multiple instances of the same data or information to verify, confirm, or otherwise validate that the multiple instances represent the same information and have not been tampered with, performing various calculations, checks, or verifications of a digital signature and/or symmetric or asymmetric keys, performing one or more cyclic redundancy check ("CRC"), a HASH calculation such as a secure hash algorithm ("SHA") SHA-1, SHA-2, or other HASH calculation, a Rivest, Shamir, and Adleman ("RSA") algorithm, digital signature algorithm ("DSA"), elliptic curve cryptography ("ECC"), or various other calculations to calculate, check, or verify a digital signature authentication techniques.

The secure hardware 220 may be configured or operable to store instructions or may be programmed to run a script. The secure hardware 220 may include a memory protection unit or a memory management unit which may also or alternatively be used to protect the secure software 218 and/or any logic used or stored in the secure hardware 220. The secure hardware 220 may be or include various hardware components, such as secure elements, integrated circuits, smart card devices, secure CPUs or processors, or various other components. Various other types of protection or security are possible.

Through the use of one or more components of a secure element 212, various protective mechanisms and functions may be utilized and established. For example, the secure element 212 may be configured or operable to gather, be aware of, and use various temporal parameters that may be leveraged to increase a level of security and access control within the secure element 212. Temporal parameters may be or include, for example, actual or current time and date information or data, or various other temporal information or data. In some systems where the secure element 212 is always powered on and maintains a constant internet, network, or cellular connectivity, the constant connectivity of the secure element 212 may be useful for gathering the temporal parameters for the secure element 212 and the device 200.

A secure element 212 of a device 200 may gather or otherwise obtain temporal parameters from one or more separate device or server in communication with the device 200, such as over or through the network 110. For example, a device 200, using the transceiver 202 and antenna 203, may communicate with one or more time servers or remote servers 175, such as a network-time-protocol ("NTP") remote server or other trusted remote server or temporal parameter provider ("remote server"), through the network 110. In some systems, the device 200 may request temporal parameters from the remote server. The remote server, in response to a request from the device 200, may transmit temporal parameters to the device 200. In other systems, the remote server 175 may be triggered, such as periodically, at intervals, when an event occurs, continuously, or at other times, at or after which the remote server 175 may communicate the temporal parameters to the device 200, such as over or through the network 110.

In some systems, the secure element 212 and the device 200 may authenticate, validate, verify, or otherwise confirm that temporal parameters received from a remote server 175 are trustworthy, have not been tampered with, are not or do not include faked online clock information, and have not been forged, prior to relying on the received temporal parameters. Authentication or validation of the temporal parameters may be performed through a confirmation of the authenticity or accuracy verification information from the remote server 175. Each trusted remote server 175 may have or include verification information. Verification information may be or include an authorization certificate or authorization certificate information, a digital certificate or digital certificate information, an NTP certificate or NTP certificate information, or various other verification certificates or information for or corresponding to one or more remote servers 175, such as one or more NTP remote servers or other servers which are known to be trusted sources of temporal parameters such as the time and date.

The secure element 212 may be programmed with, store, or otherwise access verification information for one or more remote servers 175. For example, in some systems, a series of trusted remote servers may be identified, and the verification information for the remote servers may be programmed into the secure element 212, such as in the secure memory 214. Each secure element 212 may program or store verification information for one or multiple remote servers. While the system is discussed with the secure element 212 attempting to gather or otherwise obtain temporal parameters from only one remote server at a time, in other systems, the secure element 212 may attempt to obtain gather or otherwise obtain updated temporal parameters from more than one remote server at any one time or during any designated period, such as by requesting temporal parameters from two or more remote servers simultaneously or in parallel. Various other examples are possible.

When each remote server 175 sends, transmits, or otherwise communicates temporal information to the device 200, the remote server 175 may also send, transmit, or communicate the verification information for that server. Upon receipt of the temporal information and verification information, the device 200 may access or gather the verification information stored in the secure element 212. The secure element 212 may compare the verification information received from the remote server 175 to verification information programmed or stored in the device 200. Where the verification information provided by the remote server 175 matches the verification information programmed or stored in the secure element 212, the temporal information may be considered authentic or validated and may be relied upon by the secure element 212 or the device 200 for performing one or more operations or transactions. The comparison of the verification information from the remote server 175 with the verification information programmed or stored in the secure element 212 of the device 200 may be used to authenticate or prove the trustworthiness, integrity, or accuracy of information received from the remote server 175.

Where the verification information does not match, the device 200 may discard the temporal parameters received from that remote server 175. In systems where the secure element 212 includes verification information for additional remote servers, the device 200 may attempt to gather or obtain temporal parameters from another remote server for which the secure element 212 has stored verification information for. In some systems, the device 200 may also or alternatively perform one or more security actions as discussed later. In some systems, when the verification information from a remote server 175 does not match the verification information in the secure element, the remote server may be removed from, or lowered down, the list of trusted remote servers used by the device 200. In other systems, there may be no change to the list of trusted remote servers.

In some systems, the verification information, such as the digital certificate information for one or more remote servers 175, may be programmed into the secure element 212 of a device 200 at a manufacturing or assembly stage, such as before the device 200 may be sent, sold, or used by a user or in a field or network environment. The verification information may, for example, be programmed into or otherwise stored in a secure memory 214 of the secure element 212 of the device 200, such that it may not be tampered with or manipulated. In other systems, the verification information may be programmed or stored in the secure element 212 of the device 200 during or after the device 200 has been used, and/or may be updated at various times during a lifecycle of the device 200.

The secure element 212 may request, obtain, or validate temporal parameters continuously, periodically, at various time intervals, at designated times, or otherwise when triggered, such as when an application or function is initialized. For example, the temporal parameters may be updated every minute, hour, day, week, month, or year, every time the device is powered up, or every time the device or the secure element 212 connects to the network 110, or certain period of time before a software update is going to be pushed through the device 200, or at various other times. In some systems, the secure element 212 may update the temporal parameters based on risk analysis or policies of the manufacturer, the user, or another controlling or ordering entity of the device 200, such as clientele of the manufacturer.

In some systems, a time limit or threshold may be instituted for obtaining updated temporal parameters. In these systems, if the temporal parameters are not received during a designated or determined period of time or threshold period, one or more security actions may be performed. For example, the device 200 or the secure element 212 may lock out or freeze an operation and may not allow a user or network 110 to access sensitive information or perform a secure operation or transaction. As another example, an alert or warning may be displayed to the user of the device 200, such as through or using the user interface 222. As another example, an alert or warning may be transmitted across the network 110 to one or more remote devices or users, such as to the manufacturer of the device or an operator of the network 110. Various other secure actions are possible.

The gathered and validated temporal parameters may be used by the secure element 212 in various ways. For example, temporal parameters may be used to enhance the protection of secure or sensitive processes, such as the management of applets on an embedded secure element 212 or installing updates and fixes or patches to an embedded secure element 212. The secure element 212 may use connectivity with the remote server 175 to secure a setup of time and data awareness for the secure element 212, and enhance protection with time-based signature and sequencing. For example, the embedded secure element 212 can condition sensitive processes to be performed only when the embedded secure element 212 is aware of the current time and date or other temporal parameters which have been secured achieved. Using the temporal parameters, the embedded secure element 212 may also or alternatively ensure that commands used in a sensitive process are mathematically bound to the time of their transmission.

As another example, the temporal parameters may be used with validating or verifying a source of other transmissions or inputs received by the device 200, such as an external application. Temporal parameters may be used, for example, to designate when, in what order, or how fast one or more operations or transactions are to take place and/or for measuring time. For example, an application may be programmed so that once a first function is performed or a first input is received, a second function must be performed or a second input must be received within a certain period of time. The secure element 212 may verify the temporal parameters associated with the performance of the first function or receipt of the first input. The secure element 212 may calculate, based on rules or algorithms, a time when the second function must be performed or the second input must be received by. The secure element 212 may update the temporal parameters, and when an updated temporal parameter is verified as occurring after the calculated time and before the performance of the second function or receipt of the second input, one or more security actions may be performed. Alternatively, a clock with the secure element 212 or the processor 204 may be used to track a time from the performance of the first function or the receipt of the first input. When the tracked time equals or is greater than the expected time in which the second function was to be performed or the second input received, the secure element 212 may update the temporal parameters, verify that the time period has passed, and may perform one or more security actions.

As another example, in some systems, the secure element 212 may include or access a clock of its own, such as a tamper proof clock. The secure element 212 may access the remote server 160 and obtain temporal parameters periodically or at various times to sync its own clock and ensure that the internal clock has not been tampered with, is secure, and is properly operating. For example, the temporal parameters on an internal clock may be compared with the verified temporal parameters from a remote server to ensure that the internal clock is reasonably close or within a reasonable window to the expected or verified time and date. In some systems, the internal clock may be configured to count only upwards, which may prevent a thief or hacker from tampering with or changing the time on an internal clock backward. Temporal parameters of an internal clock in the secure element 212 may be received and/or used in the same or a similar manner as the temporal parameters received from a remote server. For example, the internal clock may send the temporal parameters to one or more components of the device 200, such as a secure hardware or secure software, for use. In some instances, this information may or may not be accompanied by a secure or verifiable piece of information, such as a digital certificate, through which the secure hardware or secure software may verify the authenticity or accuracy of the information. Other variations and methods are possible.

As another example of a use of temporal parameters, the secure element 212 may use the time and data awareness to secure both the circumstances under which a sensitive process may take place, as well as the process itself. For example, where a device 200 will perform a software update, the secure element 212 may embed within the software a specific time and date at which the software update may be performed. The time and date embedded in the software may be a specific time or date. Alternatively or additionally, the secure element 212 may embed the present time and date information within the software with instructions not to update the software for a designated period of time after the embedded present time and date, such as one week from the embedded time or date. As a second feature, the software package can be digitally time-stamped when it is sent to the secure element 212. The secure element 212 can verify the digital time-stamp of the software using gathered and verified temporal parameters from a remote site to ensure that the received software package or update is trustworthy. If the time stamp on the software package does not match the verified temporal parameters, the device 200 may not perform the software update or may take one or more other security actions. Temporal parameters may be used to perform a function or task at a specified or determined time, and/or may be used so that a function or task is only performed when a secure element 212 is aware of the current time and date. Other uses of the temporal parameters are possible.

These and other uses may be designated or controlled by a device manufacturer, a user, or a controlling entity or business. For example, a device manufacturer may recognized that one or more operations may be particularly sensitive, such as an operation of loading new applications into the secure element 212 for execution, or updating the software of the secure element 212 or device 200. During manufacturing, the device manufacturer may configure or define the secure element 212 of the device 200 to require that during the performance of these particularly sensitive operations, the secure element be updated with current time and date information from a validated or verified remote server 175. Various other examples are possible.

Figure 3:
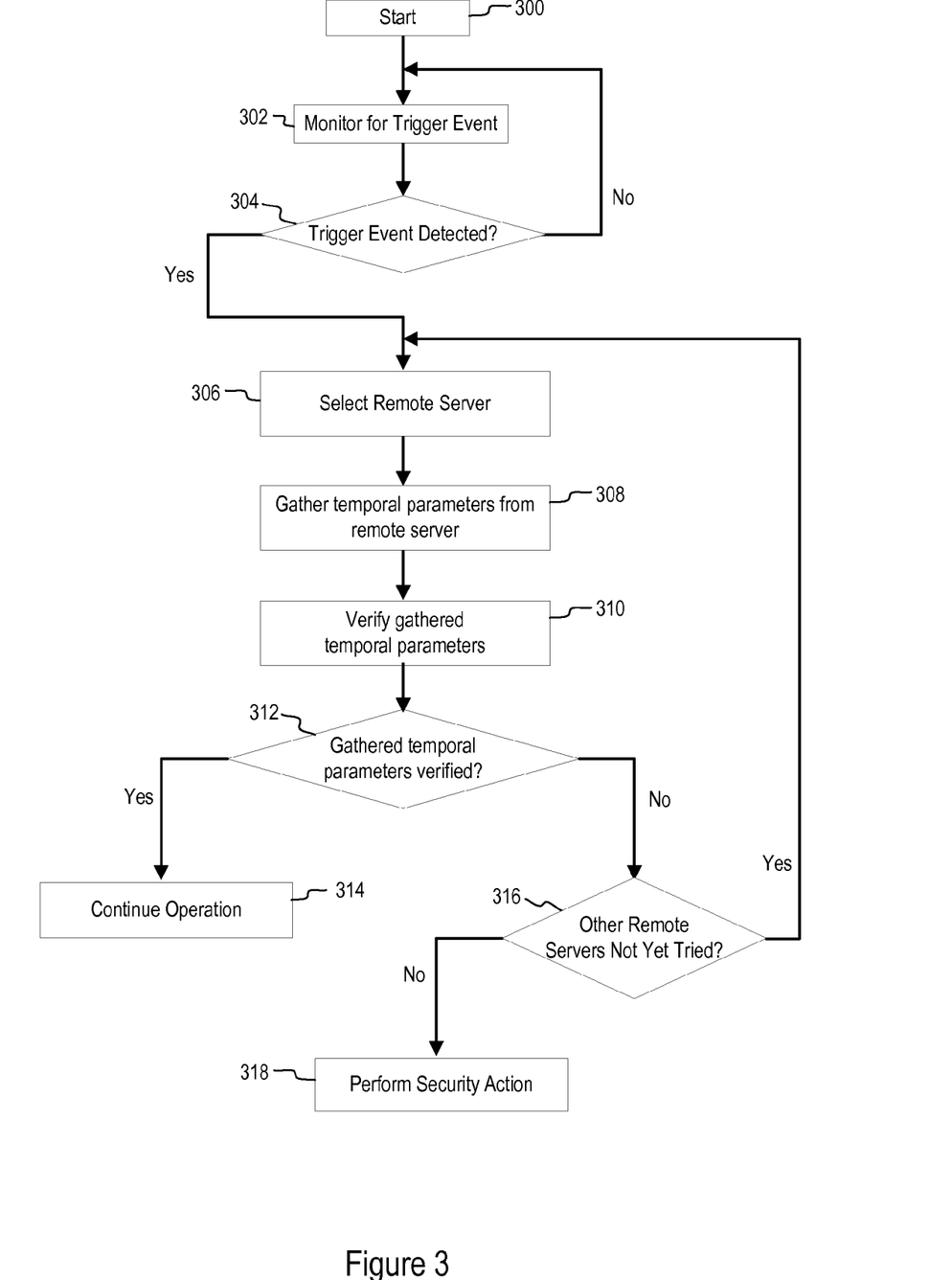
FIG. 3 is a flowchart of an exemplary method of using a device with a secure element.

FIG. 3 is a flowchart of an exemplary method of gathering and validating temporal parameters with a device 200 having a secure element 212. The gathered temporal parameters may be gathered from a remote device to verify the operation of the device 200. The method may start at block 300.

At block 302, a device 200 may monitor or otherwise identify or detect a trigger event. The device 200 may monitor one or more components, inputs, states, or statuses for the trigger event. For example, in some systems, the device 200 may monitor inputs received by the device 200 from other devices or a user. In other systems, the device 200 may monitor one or more processes, commands, code, or logic being processed or performed by the processor 204 of the device 200. In still other systems, the device 200 may monitor a counter which may be used to track an amount of time. In some systems, the device 200 may have one or more monitoring devices or hardware for performing the monitoring, or the device 200 may have one or more programs, applications, code, logic, or software that may be stored in memory, such as memory 206 or the secure memory 214, for performing the monitoring. Various other components or processes may be monitored for the trigger event.

A trigger event may be various events or take various forms. For example, the trigger event may be the receipt of one or more lines of code, instructions, or software commands, one or more steps or processes in an application or program, one or more inputs from a device or user, one or more states or statuses of the device 200 or another device, the passage of a period of time, any combination of these, or various other possible events. For example, in some systems, a trigger event may be the initialization or identification of a step in a program or application designed to perform a secure transaction with the device 200. As another example, a trigger event may be a request or command received from an entity to perform a time dependent secure operation in a device. Other examples are possible.

At block 304, a determination is made as to whether or not a trigger event was detected or has otherwise occurred. If no trigger event occurs at block 304, the method may return back to block 302 and monitor or check for the trigger event again. The device 200 may check for a trigger event continuously, periodically, when triggered, or at various other times.

If a trigger event is detected or has occurred, the method may proceed to block 306. At block 306, a remote server, such as remote server 175, may be selected. The remote server may, in some systems, be selected from a group of remote servers that the device 200 may have verification information for. The selection of a remote server may be based on various factors such as past experience, reliability, trustworthiness, or recommendations, information programmed into the device 200. In other systems, the selection of the remote server may be based on other factors or may be random. Examples of a remote server may be or include a network time protocol ("NTP") server. The remote server may track temporal parameters, such as a time or date, and may provide the tracked temporal parameters to the device 200.

Once a remote server has been selected, the method may move to block 308, where temporal parameters may be obtained or gathered from the selected remote server. The temporal parameters may be desired and obtained to verify the current or actual time. The device 200 may communicate to or with a remote server using a transceiver 202 and/or antenna 203 connected with or to the network 110.

The device 200 may request temporal parameters from the remote server. For example, the device 200 may request that an NTP server provide time and date information or other temporal parameters. In response to the request, the remote server may provide the time and date information to the device. In other methods, the remote server may transmit, without a request, temporal parameters to the device, such as when the remote server is triggered by one or more events or periods of time. The remote server may also or alternatively provide verification information with the temporal parameters, such as a digital certificate.

Once temporal parameters have been received from a remote server, the method may proceed to block 310, where the gathered temporal parameters may be verified. Each remote server may include or transmit a digital certificate with the temporal parameters provided to the device 200. Verification of the temporal parameters at block 310 may include comparing the received verification information, such as digital certificate information, from the remote server with the internal or stored verification information, such as digital certificate information, stored or programmed into the device 200. This comparison may be performed to ensure or verify an integrity of the obtained temporal parameters.

At block 312 a determination is made as to whether or not the temporal parameters are verified. Where the verification or digital certificate information provided by the remote server matches the verification or digital certificate information stored in the device 200, the secure element 212 or device 200 may consider the remote server to be operational and the time and date information it has received as accurate. In these circumstances, the method may proceed to block 314, where the operation which caused the trigger event may continue or be performed.

However, where the digital certificate information provided by the remote server does not match the digital certificate information stored in the device 200, the device 200 may consider the remote server to be corrupted or not operational and may disregard, erase, or delete the time and date information it has received. In these circumstances, the method may proceed to block 316.

At block 316, a determination may be made whether or not other remote servers exist which have not yet been contacted or tried. In some systems, the set of other remote servers which have not yet been contacted or tried may be limited to those remote servers that have verification information stored with the secure element 212. Where such other remote servers do exist, the method may return to block 306, where a new remote server may be selected, and the method may proceed as discussed above.

Where all remote servers have been tried and none have provided temporal parameters that have been verified, the method may proceed to block 318, where a security action may be performed. For example, the device 200 may send an alarm to the user or the user interface 222 for display. As another example, the device 200 may delete or erase all input authorization information collected and stored in the device 200, as well as any and all other information related to the attempted operation or transaction. The device 200 may redirect a requester to a home or new log-in display, where the requester may start the operation or transaction process over from the beginning. As another example, the device 200 may erase all personal and other authorization information collected and may lock out the requester or freeze the system from performing any further operations or transactions without a hard restart from an authorized entity. As another example, the security action may prevent access to any information stored in memory on the device. Various other security actions are possible.

A variation to the method of FIG. 3 may exist where a time limit or threshold is placed on the amount of time that a device 200 may attempt to obtain verified temporal parameters. The threshold may be set or calculated in various ways and based on various parameters, such as an average or expected time through which a device should receive a temporal parameter. The device 200 may include an internal clock which may measure the time since the last updated temporal parameter was verified or validated. When the time measured meets or exceeds the threshold value, the method may proceed directly to block 318, where a security action may be performed. Other variations are possible.

As another protective mechanism that may be incorporated with a secure element 212 or device 200, applications or programs ("applications") that may be run on or used by a device 200 to perform an operation or a transaction may be programmed with some functions existing in hardware and some functions existing in software. Examples of applications may include, for example the performance of one or more cryptographic operations, financial or other transactions, transferring of private or confidential information, or various other operations. Each application may have or perform one or more steps, actions, access rules, or functions ("functions"). For example, an application may have a combination of access rules to control access by a function or device to one or more aspects of a device 200 or secure element 212. As another example, an application may have one or more functions initializing and setting up the application, providing a display to the user interface 222 of the device 200, gathering and verifying temporal parameters from a remote server, obtaining or accessing secure or personal information, creating a digital certificate, communicating with other devices, transacting or performing secure operations, and various other actions.

Figure 4:
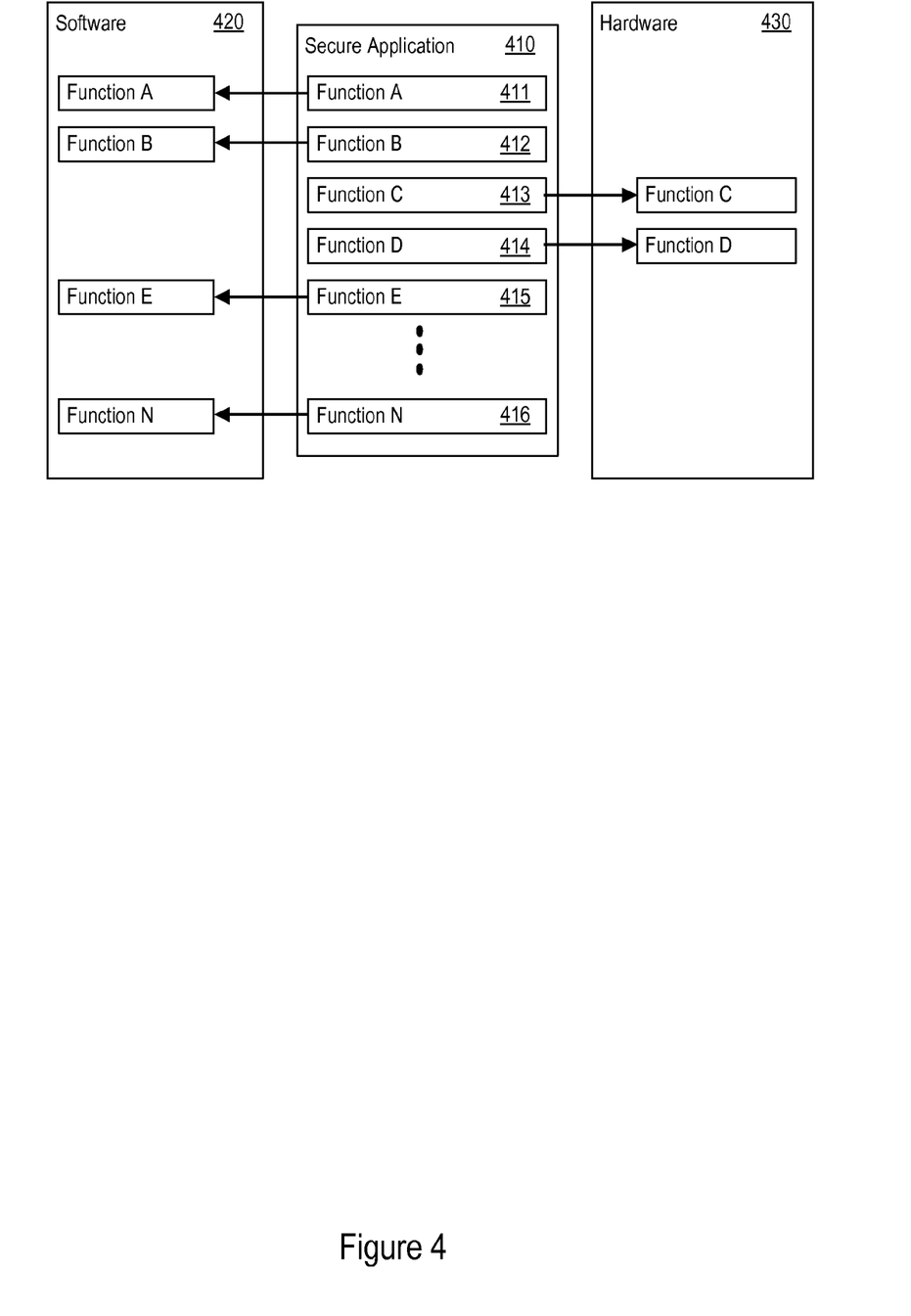
FIG. 4 is a block diagram illustrating an exemplary application for execution with a device.

FIG. 4 is a block diagram of an exemplary secure application 410 that may be used to perform one or more secure operations or transactions. The secure application 410 may include one or more functions, such as function A 411, function B 412, function C 413, function D 414, function E 415, and function N 416. The secure application 410 may include any number of steps, actions, or functions. The functions 411-416 may, in some instances, be one or more discrete steps or portions of code or logic to be performed for the application, or any number or combination of rules or actions to be performed. Each of the functions 411-416 may need to be performed for proper operation of the secure application 410, or one or more functions 411-416 may be optional.

In some systems, a portion of the application or logic necessary to perform functions of an application may be programmed, coded, or otherwise stored on one component, while a second portion of the logic may be programmed, coded, or otherwise stored on a second, different component. For example, one or more functions of an application, such as function A 411, function B 412, function E 415, and function N 416 of secure application 410, may be programmed or coded as software 420, while one or more other functions of the same application, such as function C 413 and function D 414 of the secure application 410, may be stored as logic in hardware 430. In other systems, one or more functions such as function C 413 or function D 414 may be stored in local non-volatile memory, electrically erasable programmable read-only memory ("EEPROM"), Flash memory, encrypted external memory, as a script, or in various other ways.

Different portions of an application may be stored in software 420 or hardware 430. In some systems, software 420 may be or include secure software 218 or other software or logic stored in a secure memory 214 of a secure element 212, and the hardware 430 may be secure hardware, such as secure hardware 220 of the secure element 212. In these systems, the entire application 410 may be stored or programmed in the secure element 212. In some other systems, part or all of the software 420 may be other secure or unsecure logic or memory included with or accessible to the device 200, such as application 210 or other logic 208, and/or the hardware 430 may be various other secure or unsecure hardware included with or accessible to the device 200. Programming parts of the application in the software 420 and hardware 430 may be performed or accomplished during a manufacturing or other stage prior to delivery or use by a user. In other systems, the application may be programmed or stored after the device 200 has been manufactured.

In some systems, many functions of an application, including many ministerial or non-critical functions of an application, may exist in or as software 420, while one or more critical or security functions of the application may be placed as logic in the hardware 430. As an example, when an application or software 420 needs to make or perform a significant step, such as whether or not an application is entitled to read or write to specific addressed on hardware 430, the decision may be based not only on the software 420, but also on the logic stored on the hardware 430. As such, a significant or critical portion of an application may be protected from a thief or hacker accessing and manipulating the software 420.

For example, one or more functions may be needed in an application for testing and verifying one or more environmental parameters of hardware 430 prior to performing another function, such as a cryptographic execution. The testing of the environmental parameters may be needed to ensure that the hardware 430 has not been attacked, such as through laser or light attacks or other physical attacks. The function for performing the environmental testing of the hardware 430 may be placed on the hardware 430. As such, the software 420, before performing the cryptographic execution, may go to the logic stored in the hardware 430, which may be used to check internally and ensure that the environmental parameters of the hardware 430 meet all criteria required. The hardware 430, after performing the verification function, may communicate with the software 420 and let the software know if it is ok to perform the cryptographic operation.

Other examples of possible critical functions that may be placed on hardware 430 may include functions related to a verification of secure information, a validation of a digital or authentication certificate, a performance of a cryptographic operation, testing of the software 420 or environmental parameters of the hardware 430, or execution of a secure function, may be implemented as logic in the hardware 430, while all other functions of the application 410 may be stored in software 420. In other systems, non-critical functions of an application may be placed in the hardware 430 and critical or security functions of the application 410 may be placed in software 420. Determination of which functions may be placed in hardware 430 or software 420 may, in some systems, be made based on a manufacturer's or clientele's preferences, or may be made for one or more security purposes or reasons. Other variations are possible.

The functions of the application 410 may, in some systems, operate as if the all of the functions were programmed, coded, or otherwise stored in only one component of the device 200. For example, where function B 412 normally would be completed and function C 413 initiated, the processor 204 of the device 200 operating the software 420 performing the function B 412 may then recognize, such as through a command programmed at the end of the function B 412, that the next function to be performed is function C 413 located in the hardware 430. The processor 204 may then access the hardware 430 and perform function C 413 and function D 414, after which the processor 204 may recognize that the next function E 415 to be performed resides in the software 420. The processor may then access the software 420 and continue with the operation of the secure application 410. Other variations or examples are possible.

While the functions 411-416 of the secure application 410 are shown as being stored in software 420 and hardware 430, in some systems, functions of the secure application 410 may be stored in firmware, memory, or any combination of one or more software modules, hardware modules, firmware modules, or memory. For example, a first function A 411 may be stored in a first secure memory, a second function B 412 may be stored in a second secure memory, a third function C may be stored in a first hardware, a fourth function D may be stored in an unsecured memory, a fifth function E may be stored in a second hardware, and so forth. Other variations are possible.

By storing portions of a secure application 410 in different components, such as software 420 and hardware 430, the secure application 410 may be protected from a thief of hacker able to break into or hack one of the software 420 or hardware 430. This may prevent, for example, attacks that otherwise could be applied to decision making in software 420, as well as physical attacks on the hardware 430.

As another protective mechanism that may be utilized with a secure element 212 or device 200, a secure element 212 may be configured to perform or execute a script or sequence of commands loaded from and coded or programmed within the secure element 212.

A secure element 212 may have the capability of performing various functions, such as cryptographic functions like encryption or decryption, arithmetic functions, authorization or certification of verification information, transaction functions, software or other updates or patches, and various other functions. In systems where no scripts are coded or otherwise programmed into a secure element 212, performance of many functions by the secure element 212 may require a step by step communication with the secure element 212, which may require a step-by-step or back and forth communication with the secure element 212. For example, where an external application intends to utilize a decryption function of the secure element 212, an external application may first initiate a communication with the secure element 212. After initiation, the external application may exchange information with the secure element 212 to authenticate the external application. After authentication, a first portion of information may be sent to the secure element 212 for decryption. For example, the secure element 212 may be configured to only decrypt one sentence or piece of information at a time. After the secure element 212 has performed the desired function, such as the decryption, the first time, the secure element 212 may send the output back to the external application. After this, the external application may send the second subset of data for decryption, and the process may continue. In some processes, the external application may need to reauthenticate before sending each new piece of data.

Reduction or elimination of many back and forth steps and lines of communication may be possible by programming or coding a script in the secure element 212 which may be used to perform one or more steps, multiple functions, or one or more applications in succession, seamlessly, and internally upon a trigger event, such as a receipt of a known command. Scripts may be or include any combination of commands, functions, rules, actions, codes, logic, or steps which may be combined and performed internally within the secure element 212. An example of a script which may be or be included within the secure element 212 may be a script that is or includes an application executing on a secure element platform 212 to control access to a secure element 212 by an external application, function, or device.

As another example, a secure element 212 may be programmed with a script for performing an encryption or decryption of an entire body of data or information upon receipt of an encryption or decryption command accompanied by a set of data to be encrypted or decrypted. When an external application or device requires or desires to decrypt a set of data, the external application may merely call the encryption or decryption script with the specified command and the global data to be encrypted or decrypted. Upon receipt of the command and the set of data to be decrypted, the secure element 212 may run the encryption or decryption script on the accompanying data, completing the process internally and sending back the results when the process is finished.

As another example, a secure element 212 may be configured to perform various mathematical functions individually. The secure element 212 may be programmed with one or more pieces of code, software, or a script to perform a succession of specific functions or applications internally when prompted. As a simplified example, where the secure element 212 is capable of performing subtraction and division individually, the secure element 212 may be programmed to determine a function $X=[A-B/C]$ when a certain script is triggered and run. The secure element 212 may then determine X without having to first engage the secure element 212 to perform A-B, and then to perform the division of the subtraction result by C. Rather, the entire function may be performed internally within the secure element 212, saving time and processing and computing power.

A script may also be used to perform various other tasks, such as for authenticating a digital signature or a secure element. For example, where a payment terminal wants to authenticate itself to a secure element 212, the terminal may trigger a script for the authentication of a secure element or digital signature and may send all data or information for performing the authentication. The secure element 212 may receive the triggering command for the authentication script and the accompanying data, and may perform the required processing to authenticate the digital signature. The results of the digital signature authentication may be provided back to the payment terminal after the authentication script has run.

Another example of a possible script may be or include a script for performing one or more software updates for a device 200. All data required to perform an update may be sent to the secure element 212 with the command to run a software update script. The script can be programmed to authenticate the require, verify its integrity, make sure there are no illegal lines of code in it, ensure that the secure element 212 has not been tampered with, and then install the software update. Various other examples of scripts and functions are possible.

A script may be programmed or coded independently of any language or platform, and may run regardless of the platform or language used. A constant trigger event or set of commands may be used to initiate the script execution, and may be executed on any or all platforms or using any language. All that may be required to run the script may be a receipt of the trigger event or command.

While the script may be triggered or initiated upon the receipt of a command, other examples of trigger events that may cause or initiate the execution of a script may include the receipt of an input, the processing of one or more lines of code or software, the activation or running of one or more scripts, the occurrence, receipt, or observation of one or more events, the passing of a certain interval of time, the recognition of a temporal event, or various other trigger events.

Each secure element 212 may have one or more scripts coded or programmed into one or more components of the secure element 212. In some systems, a script may encompass multiple functions. In some of these systems, part of the script may be programmed into one part of the secure element 212, such as the secure software 218 of the secure memory 214, while another part of the script may be programmed into a second part of the secure element 212, such as the secure hardware 220. Execution of the script may be the same as or resemble execution of the secure application 410 in FIG. 4.

The secure element 212 may run a script with or in different modes. For example, in a report mode, the secure element 212 may offer a report to the external application or user, such as through the user interface 222, which may indicate whether one or more steps of the script have been performed successfully or not, and/or may include details about a status of the performance of a function. In some instances, the report may be generated after each step of the script. In others, the report may be generated after only some steps or at different time intervals. In a silent mode, the secure element 212 may only report as to whether or not the entire script was run correctly and passed or failed. In the silent mode, no details are given, which may further protect the device from thieves or hackers who may otherwise benefit from receiving information about why a script failed. In the silent mode, the instructions or a script may not be displayed or accessible to the entity sending the command. In some versions of the silent mode, such as where a script is executed, the only information transmitted or accessible to the entity sending the command to run the script is an outputted result, such as a result of a secure operation function. Other variations are possible.

Figure 5:
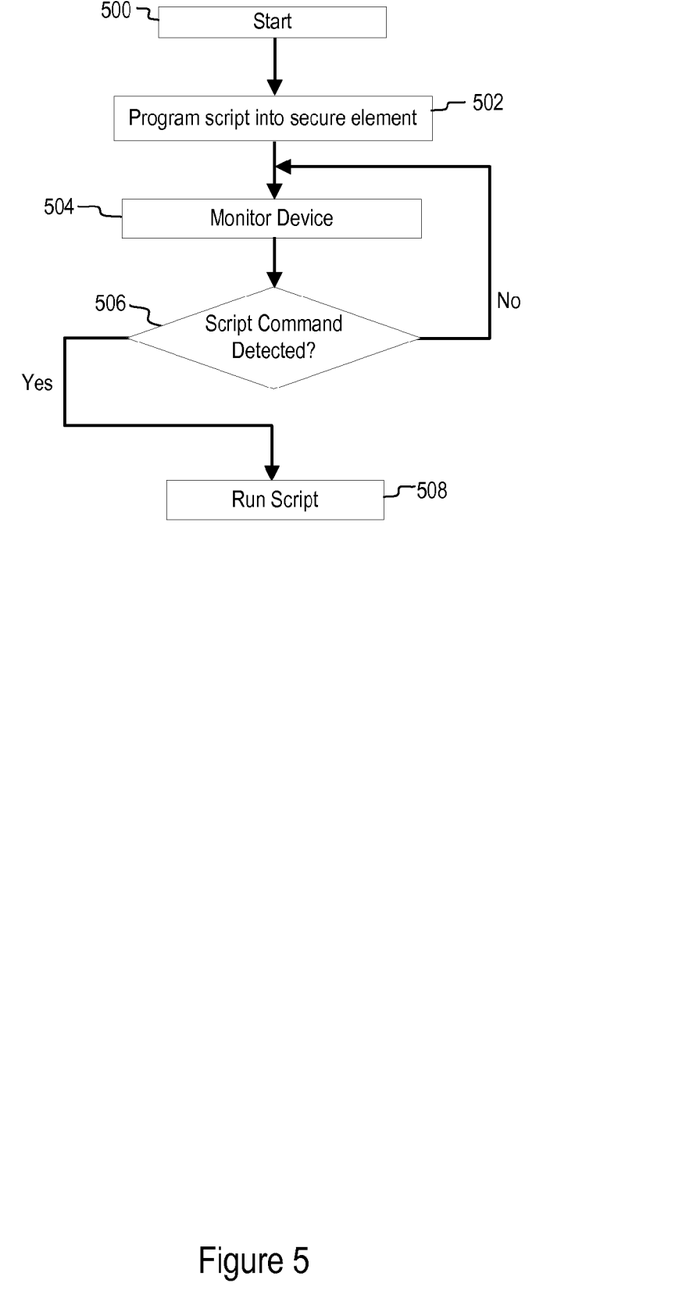
FIG. 5 is a flowchart of an exemplary method of using a device with a secure element.

FIG. 5 is a block diagram of an exemplary method for the secure element 212 to monitor and run a script. The method may begin at block 500. At block 502, a script may be created and programmed into the secure element 212. For example, a script for performing one or more encryption or decryption operations may be programmed or otherwise stored in the secure element 212.

At block 504, the secure element 212 or another component of the device 200 may monitor an application or input into the secure element 212 or device 200. For example, an external application may communication with the secure element 212 or the device 200. The secure element 212 or the device 200 may receive all inputs and commands from the external application, and may monitor the inputs or commands to see if a trigger command is detected.

At block 506, the secure element 212 or the device 200 may determine whether or not the script command is received. For example, the secure element 212 or the device 200 may compare each received command or input from the external application and may compare the received commands or inputs with the script command. Where no script command is received, the method may proceed back to block 504 to continue monitoring all inputs or code received by the secure element 212 or the device 200.

If instead a script command is received at block 506, the method may proceed to block 508 where the script is run. The operation of the script may follow any of the methods of operation discussed herein. In some systems, one or more results may be returned. In other systems, no results are returned. Other variations and methods are possible.

Execution of multiple functions internally in the secure element 212, through the use of a script or other program or coded logic, has many advantages. For example, performing multiple functions may save time and promote efficiency, as fewer back and forth communications between the external application and the secure element 212 may be required. Additionally, fewer computing resources may be required, as a larger set of functions may be performed solely with one element or component, rather than required a component or device running the external application to store intermediate data. This may also promote less confusion to a user, who now may input one set of data and be returned a bottom line set of answers. Further, fewer communication resources may be needed or used, as the same or more functions may be performed requiring fewer communications. An additional advantage in performing multiple functions internally in the secure element 212 through the use of a script or other program or coded logic is that the responses of each function or step in a process are not seen externally from the secure element 212.

Figure 6:
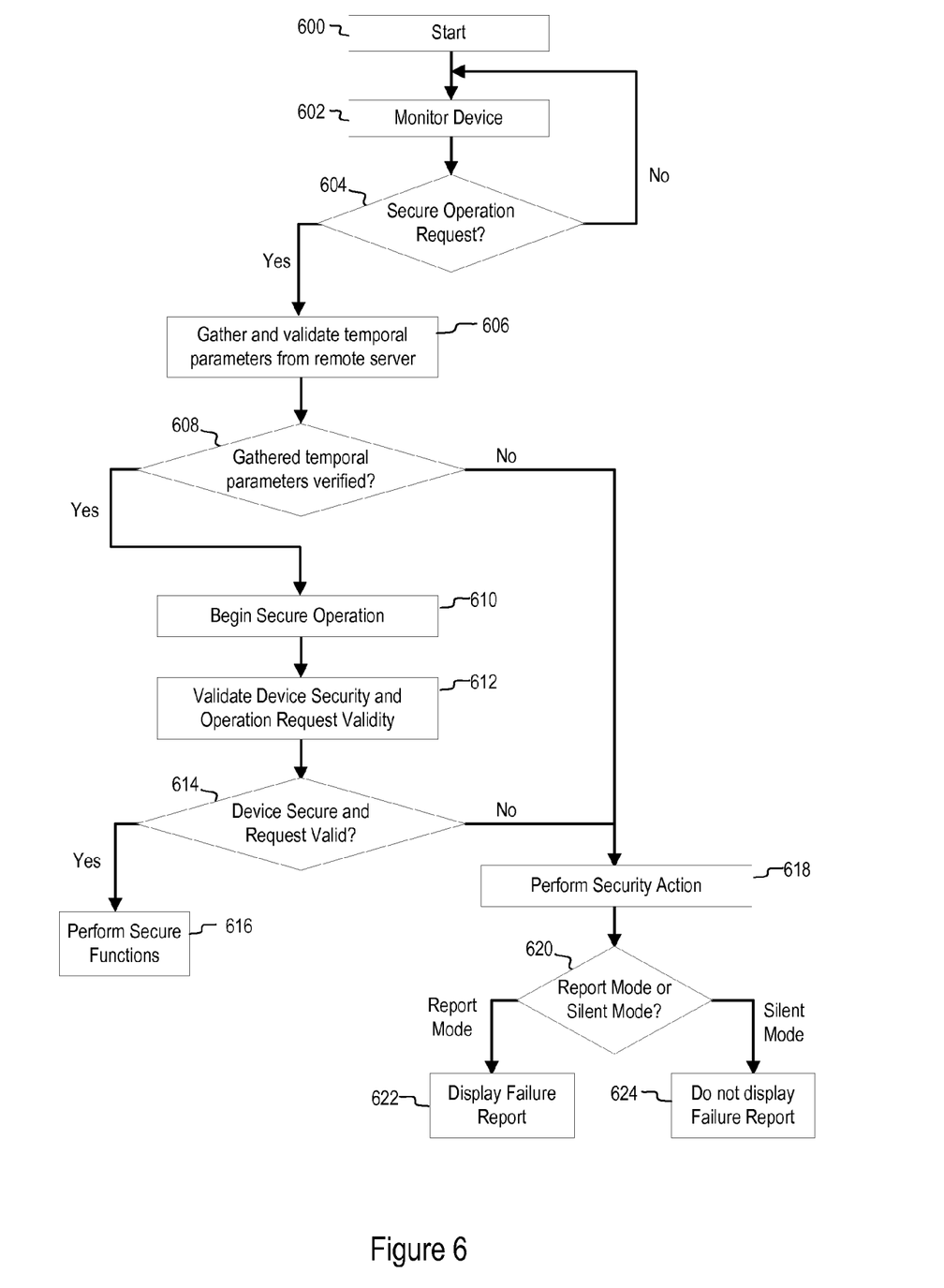
FIG. 6 is a flowchart of an exemplary method of using a device with a secure element.

In some systems, one or more of the protective mechanisms of the secure element 212 may be used together in various ways. For example, FIG. 6 shows an example method of how the secure element 212 of the device 200 may conduct a secured operation and transaction while protecting the device 200 or application from thieves or hackers. The method may begin at block 600.

At block 602, the method may monitor the device 200. Monitoring of the device 200 may include monitoring one or more inputs, requests, or commands received by the device 200 or secure element 212, such as from one or more other devices, users, entities, or external applications. The secure element 212 or device 200 may monitor for an instruction or command to execute one or more secure operations or transactions. In some systems, the device 200 may have one or more monitoring devices or hardware for performing the monitoring, or the device 200 may have one or more programs, applications, code, logic, or software that may be stored in memory, such as memory 206 or the secure memory 214, for performing the monitoring. Examples of secure operations that may be requested may include financial transactions, decryption or encryption operations, software updates, or various other operations as discussed.

In some systems, the secure element 212 may receive a trigger or specified command which may trigger the running or execution of a script programmed in the secure element to perform the secure operation. The script may include instructions for performing one or more functions of the secure operation, such as instructions for executing an initialization function, instructions for executing an entity verification function, instructions for executing a device security function, instructions for executing a secure operation function to be performed at a specified time, and instructions for executing an output function that outputs the result of the secure operation function to the entity. Other variations are possible.

At block 604, the secure element 212 or device 200 may determine whether or not a secure operation has been requested. A secure operation request may be request to perform one or more secure operations, secure transactions, secure applications, secure functions, or various other functions, actions, steps, computations, calculations, operations, or transactions. The secure element 212 or the device 200 may detect or receive various inputs or commands for the performance of the secure operation. A request to perform a secure operation may come from one or more other devices, users, or external applications, such as in the form of a received transmission, request, command, code, logic, or communication. Alternatively, the request may be input by a user using the device 200, such as through a key press, voice command, touch, or other input.

Where no secure operation request has been received or detected, the method may return to block 602, and the device may continue to be monitored.

Where, instead, a secure operation request is detected, such as where a command for the secure element 212 to run a script is received, the method may proceed to block 606. At block 606, one or more temporal parameters may be gathered and validated. The temporal parameters may be gathered and validated in various ways, such as, for example, in a manner similar to or the same as that shown in FIG. 3. Other variations are possible.

At block 608, the gathered temporal parameters are verified. Verification of the temporal parameters may be accomplished by authenticating or otherwise verifying digital or authentication certificate information received from the remote server 175 along with the temporal parameters. The temporal verification performed in block 608 may be similar or the same as the verification in blocks 310 and 312 of the method in FIG. 3.

If the temporal parameters are not verified, the method may proceed to block 618, where a security action may be performed. In alternative methods, other remote servers may be tried, as in block 316 of the method of FIG. 3, before proceeding to block 618 and performing a security action.

If the temporal parameters are verified, the method may proceed to block 610 where the secure operation may be initiated and/or the script may be run. The secure operation may be or include software or one or more applications or portion of an application, such as the secure application 410, the application 210, or the secure software 218. One or more functions of the secure operation may be stored in software 420, such as secure software 218. One or more other functions of the secure operation may be programmed or stored in hardware 430, such as secure hardware 220. In some systems, the first function of the secure operation may be performed by the software, in which case the software may be initiated and the secure operation begun at block 610. In other systems, however, where the first operation or function of the secure operation is to be performed by hardware, the hardware may be accessed and the operation begun at block 610. Where the secure operation includes or is performed by the execution of a script, one or more instructions in the script may be run or executed. For example, an initialization function of the script may be executed with the software component to begin execution of the script. Other variations are possible.

At block 612, the secure element 212 may validate the device or secure element security and safety and the operation request validity. In some methods, this may be required before performing any secured functions, such as financial transactions or cryptographic functions.

The secure element 212 may utilize one or more functions or instructions, as well as various hardware components, to verify or confirm the device or secure element security or status. For example, the secure element 212 may access or utilize the secure hardware 220, which may include operations to check one or more sensors, crypto accelerators, and memory integrity or other parameters of the secure element 212. In some systems, the functions necessary to check a device or the secure element's security may be programmed into the secure hardware 220 of the secure element. For example, instructions to execute a device security function of a script to determine that a security of the device has not been breached may be stored in hardware of a secure element 212. As such, in these systems, the secure hardware 220 may be initiated to perform these functions at block 612. For example, the secure software 218 of the secure element 212 may initiates the execution of a device security function by the secure hardware 220, and the secure hardware 220 may report the results of the device security function to back to the secure software 218 when completed. In other systems, the security level, validity, or integrity of the secure element 212 may be checked with software or logic, such as secure software 218 stored in secure memory 214.

The secure element 212 may also or alternatively utilize one or more functions or instructions to verify whether or not the user or external application requesting the secure operation has the authority or access to perform the requested function. For example, one or more operations may be programmed into software, such as functions stored in or part of the secure software 218, which may meanwhile authenticate the user or external application which requested the encryption, and/or confirm with an access condition table that the user or external application may be entitled to perform the cryptographic operation. Where a script is run, the script may include instructions to determine the access right for an entity requesting performance of the function, or instructions for executing an entity verification function to determine whether the entity has access rights to command execution of the secure operation function. These or other instructions may be executed by one or more components of the secure element 212, such as with the software component after an initialization function has been executed.

An example method of performing an entity verification function may include first obtaining entity identification information for the entity, and then accessing a condition table identifying a plurality of entities and access rights for each of the entities. The method may also include identifying access rights for the entity in the condition table using the entity identification information. The identified access rights in the condition table may be compared with access rights necessary to command execution of the secure operation function. Based on the comparison, a determination may be made as to whether the entity has access rights to command execution of the secure operation function based on the comparison. Other examples are possible.

Verification of the device security and validation of the access of the party requesting the secure operation may be performed using or depend on the temporal parameters. For example, once the temporal parameters have been confirmed, the secure element 212 may wait until a designated time immediately before the decryption is to take place, such as 1 minute immediately before any decryption, before performing the environmental parameters and security check. In other systems, no such dependence may occur. Other variations are possible.

At block 614, the method may determine whether or not the device or secure element is secure and the request valid. A requested operation, function, or application being performed by a secure element 212 or other component of the device 200 may fail or not be verified for various reasons. For example, malicious software may attempt to execute a script for the secure element 212 or another component of the device 200. The malicious software will fail because it may not have all of the authentication data required for execution of the script or because the secure element 212 may not be up to date with the time and date necessary to perform the script. In other examples, a requested operation, function, or application may fail because illegal data may be provided, data may not pass integrity or validity tests, or data may be improperly or illegally encrypted with an incorrect encryption kit and man not be decrypted by the secure element 212. In still other examples, the device security may be compromised by various physical attacks, such as laser attacks, light attacks, moisture attacks, and other physical attacks. Various other attacks and failures are possible and may be detected in blocks 612 and 614.

If the device security was approved and the operation request was valid, the method may proceed to block 616, where the secure functions, such as the transaction or the cryptographic functions, may be performed by the secure element 212. For example, in some systems, a secure operation function of a script may be executed with a software component of the secure element 212 when the software component determines that the entity has access rights to command execution of the secure operation function, a hardware component of the secure element 212 determines that the security of the device has not been breached, and a specified time occurs.

If instead the device security was not approved or the operation request was not valid, the method may proceed to block 618, where a security action may be performed. In some systems, a security action may be performed when a software component such as the secure software 218 determines that an entity does not have access rights to command execution of the secure operation function based on the comparison, or when a hardware component such as the secure hardware 220 determines that the security of the device has been breached. The security action may be that the device 200 may delete or erase all input authorization information collected and stored in the device 200, as well as any and all other information related to the attempted operation or transaction. As another example, the device 200 may erase all personal and other authorization information collected and may lock out the requester or freeze the system from performing any further operations or transactions without a hard restart from an authorized entity. Various other security actions are possible. In other systems, no security action may be performed.

At block 620, a determination may be made as to whether or not the device 200 or secure element 212 is operating in a report mode or a silent mode. The device may be set during manufacturing or before shipment and operation by a user to operate in only one mode, or the user, business, or device operator may choose the mode.

If the device is operating in a report mode, the method may proceed to block 622 where a failure report may be displayed to the user. The device 200 may send an alarm or display indicating a failure and/or one or more details of the failure to the user, external application, or the user interface 222 for display. The device 200 may redirect a requester to a home or new log-in display, where the requester may start the operation or transaction process over from the beginning. Such a failure report may benefit a user in that the user may be aware of problems in performing the secure operation and may be able to rectify them without significant time spent troubleshooting.

If the device is operating in a silent mode, the method may proceed to block 624, and no failure report may be displayed to the user. In some systems, a simple "fail" message or similar may be displayed, while in other systems, nothing may be displayed. The device 200 may not alarm a user or display any failure or notification, which may keep a thief or hacker monitoring the device 200 from figuring out why it failed, and may prevent more directed future attacks.

In some systems, a device 200 may institute one or more other security features and/or reporting modes. For example, in some systems, a device may institute or perform a dummy operation which may look or resemble the desired operation to a user, but which may not actually perform the steps of the desired operation. Progress from the dummy operation may or may not be displayed to the user. For example, where an intrusion, theft, hacking, or other compromise of the device 200 or method may be detected, the device 200 may stop running the desired operation and may initiate and run a dummy operation, displaying the results and progress of the dummy operation to the thief, hacker, or user. In some systems, the dummy operation may or may not indicate that the operation was successful. In this way, a thief or hacker may be unaware that the device 200 has detected and is aware of an intrusion, theft, hacking, or other compromise of the device 200, and may not be able to trace when or how the device 200 became aware of the intrusion. Other examples are possible.

One or more of the blocks of FIG. 6 may be performed at different times. For example, in some systems, temporal parameters may be gathered before or at various times throughout the performance of a secure operation. In some of these systems, temporal parameters may be used to constantly validate and verify multiple functions or steps of a secure operation. In other systems, time information may be gathered or obtained from a remote server to determine when a specified time, such as a time to execute one or more instructions, occurs. As another example of modifications to the method, in some system, the type of security action performed may depend on whether or not the device is operating in report mode or silent mode. As another example, the determination of report mode or silent mode may take place at any time during the operation of the device. As another example, in some methods, no validation of the device security or request validity may be required or take place. Various other alternatives and variations are possible.

The device 200 may be or represent any of the electronic devices 125, 135, and 160 used by one or more users. A transceiver 202 that may be used with device 200 may be a wireless or wired transceiver. The transceiver may be or include one or more of a receiver or receiving component and a transmitter or transmitting component, and/or may be any of these components individually. In some systems, a receiver may refer to a transceiver or alternatively to only a receiving component. The transceiver 202 may be connected or in communication with one or more antennas 203, which may be used to transmit or receive one or more signals to one or more external or independent devices, servers, businesses, components, parties, or antennas. For example, a receiver may be configured to receive, from an entity, a request to perform a function. As other examples, commands, instructions, inputs, code, logic, digital signature or verification information, or applications may be transmitted to (or from) a transceiver 202 by (or to) one or more external or independent components or parties external to the device 200. The transmitted information may be collected, analyzed, and/or otherwise used by the device 200 or third parties in communication with antenna 203. The device 200 may receive or send information continuously, at specified time intervals, at the performance of one or more functions, when a threshold level is reached, or at various other times or points. Other variations are possible.

The device 200 may communicate with other devices or antennas over or through one or more networks 110. The network 110 may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols. The transmitted and received signals may adhere to any of a diverse array of formats, protocols, modulations, frequency channels, bit rates, and encodings that presently or in the future may support reverse direction protocols. The transceiver 202 may support the 802.11a/b/g/n/ac standards, the 60 GHz WiGig/802.11TGad specification, Bluetooth, Global System for Mobile communications ("GSM"), Time Division Multiple Access ("TDMA"), Frequency Division Multiple Access ("FDMA"), Code Division Multiple Access ("CDMA"), or other wireless access techniques or protocols. In some systems, an antenna 203 may be used by the device 200 to provide location information to the device. For example, antenna 203 may be a cellphone tower that may be used to determine or approximate the location of the device 200. In other systems, the device 200 may not include a transceiver 202 or antenna 203, and/or may not be configured to communicate with other devices over or using a network.

A processor 204 that may be used with the device 200 may be or include a central processing unit ("CPU"), a graphics processing unit ("GPU"), or both. The processor 204 may be or include one or more general processors, digital signal processors, application specific integrated circuits, field programmable gate arrays, servers, networks, digital circuits, analog circuits, combinations thereof, or other now known or later developed devices for analyzing and processing data. The processor 204 may be configured to run or execute one or more functions, software, code, logic, or other applications, such as, for example, the application 210 or the secure software 218.

A memory that may be used with device 200, such as memory 206 or secure memory 214, may be a main memory, a static memory, or a dynamic memory. The memory, such as memory 206 or secure memory 214, may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. Where the memory, such as memory 206 or secure memory 214, includes a computer-readable medium, the computer-readable medium may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In one embodiment, one or more memory components, such as memory 206 or secure memory 214, include a cache or random access memory for the processor 204. In alternative embodiments, the memory may be separate from the processor 204, such as a cache memory of a processor, the system memory, or other memory. The memory, such as memory 206 or secure memory 214, may be an external storage device or database for storing data. Examples include a hard drive, CD, DVD, memory card, memory stick, floppy disc, universal serial bus ("USB") memory device, or any other device operative to store data.

The device 200 may or may not include one or more input devices, such as a number pad, a keyboard, or a cursor control device, such as a mouse, or a joystick, touch screen display, remote control or any other device or component operative to interact with the device 200. The user interface 222 may include a graphical user interface ("GUI"), which may include a display unit, such as a liquid crystal display ("LCD"), an organic light emitting diode ("OLED"), a flat panel display, a solid state display, a cathode ray tube ("CRT"), a projector, a printer or other now known or later developed display device for outputting determined information. The display unit may act as an interface for the user to see the functioning of the processor 204, or specifically as an interface with the software stored in memory, such as memory 206 or secure memory 214.

The present systems and methods may be used or may implement an embedded secure element, such as secure element 212, residing in a mobile device, such as mobile device 200. The mobile device may have internet connectivity and/or cellular connectivity. The mobile device may have easy access to online time servers, such as the remote server 160. This connectivity may allow the embedded secure elements to be aware of time and date. Such ability maybe utilized to enhance protection of sensitive processes, such as managing of applets on a secure element, installing updates and fixes (Patches) to the secure element, and others. As discussed, the systems or methods may include at least two mechanisms, such as a secure setup of time and data awareness by the secure element and enhanced protection with time-based signature and sequencing. With these combinations, the secure element 212 may condition sensitive processes to be performed, for example, only when the secure element 212 is aware of a current time and date, such as through a securely achieved time and date. As another example, commands used in a sensitive process may be mathematically bound to the time of their transmission, which may provide security not only of the circumstances of the sensitive process, but also the process itself. Other examples are possible.

The methods, devices, and logic described above may be implemented in many different ways in many different combinations of hardware, software, and firmware, or various combinations of hardware, software, and firmware. For example, all or parts of the system may include circuitry in a controller, a microprocessor, or an ASIC, or may be implemented with discrete logic or components, or a combination of other types of analog or digital circuitry, combined on a single integrated circuit or distributed among multiple integrated circuits. All or part of logic, such as logic 208 or logic within the secure memory 214, may be implemented as instructions for execution by a processor 204, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A device, comprising:
a receiver configured to receive a request to perform a function;
a secure element connected with the receiver, the secure element to verify the request to perform the function, where the secure element is configured to operate in either a report mode or a silent mode, where details about a status of the performance of the function are displayed when the device operates in the report mode, and where no details about the status of the performance of the function are displayed when the device operates in the silent mode.

2. The device of claim 1, where the request to perform a function comprises a command to execute a script programmed in the secure element.

3. The device of claim 2, where the script includes the instructions to determine an access right for an entity requesting performance of the function.

4. The device of claim 3, where a script is not displayed to the entity.

5. The device of claim 3, where a result of an executed script is displayed to the entity.

6. The device of claim 3, where a pass or fail report based on whether or not the script was executed correctly is displayed to the entity.

7. The device of claim 1, further comprising a hardware module programmed with instructions to verify that a security of the secure element has not been breached.

8. The device of claim 1, further comprising a software module including instructions to determine an access right for an entity requesting performance of the function.

9. A method for performing a secure operation, comprising:
receiving a request to perform a time dependent secure operation in a device;
obtaining temporal parameters and verification information to verify the current time;
comparing the received verification information with internal verification information stored in the device to verify an integrity of the obtained temporal parameters; and
performing the secure operation in accordance with the temporal parameters when the received verification information matches the internal verification information.

10. The method of claim 9, further comprising storing internal verification information for a remote server.

11. The method of claim 10, further comprising receiving temporal parameters and verification information from another server when the received verification information from the remote server does not match the internal verification information.

12. The method of claim 9, where the temporal parameters and verification information are obtained in response to a request for temporal parameters sent by the device.

13. The method of claim 9, where the secure operation comprises a business transaction or cryptographic function.

14. The method of claim 9, where the request is received from an entity.

15. The method of claim 14, further comprising obtaining entity identification information for the entity and identifying access rights for the entity.

16. An electronic device, comprising:
a receiver configured to receive a request to perform a function;
a secure element connected with the receiver, the secure element to verify the request to perform the function, where the function is scheduled to be performed at a specified time, where the secure element obtains the actual time from a remote server, and where the secure element performs the function when the specified time equals the actual time.

17. The electronic device of claim 16, where the function comprises a software update.

18. The electronic device of claim 16, where the actual time is obtained with a network time protocol.

19. The electronic device of claim 16, further comprising a hardware module programmed with instructions to verify that a security of the secure element has not been breached.

20. The electronic device of claim 16, further comprising a software module including instructions to determine an access right for an entity requesting performance of the function.

* * * * *